V. A. FYNN.
SAFETY DEVICE FOR AUTOMOBILES.
APPLICATION FILED JUNE 22, 1917.
1,321,618.
Patented Nov. 11, 1919.
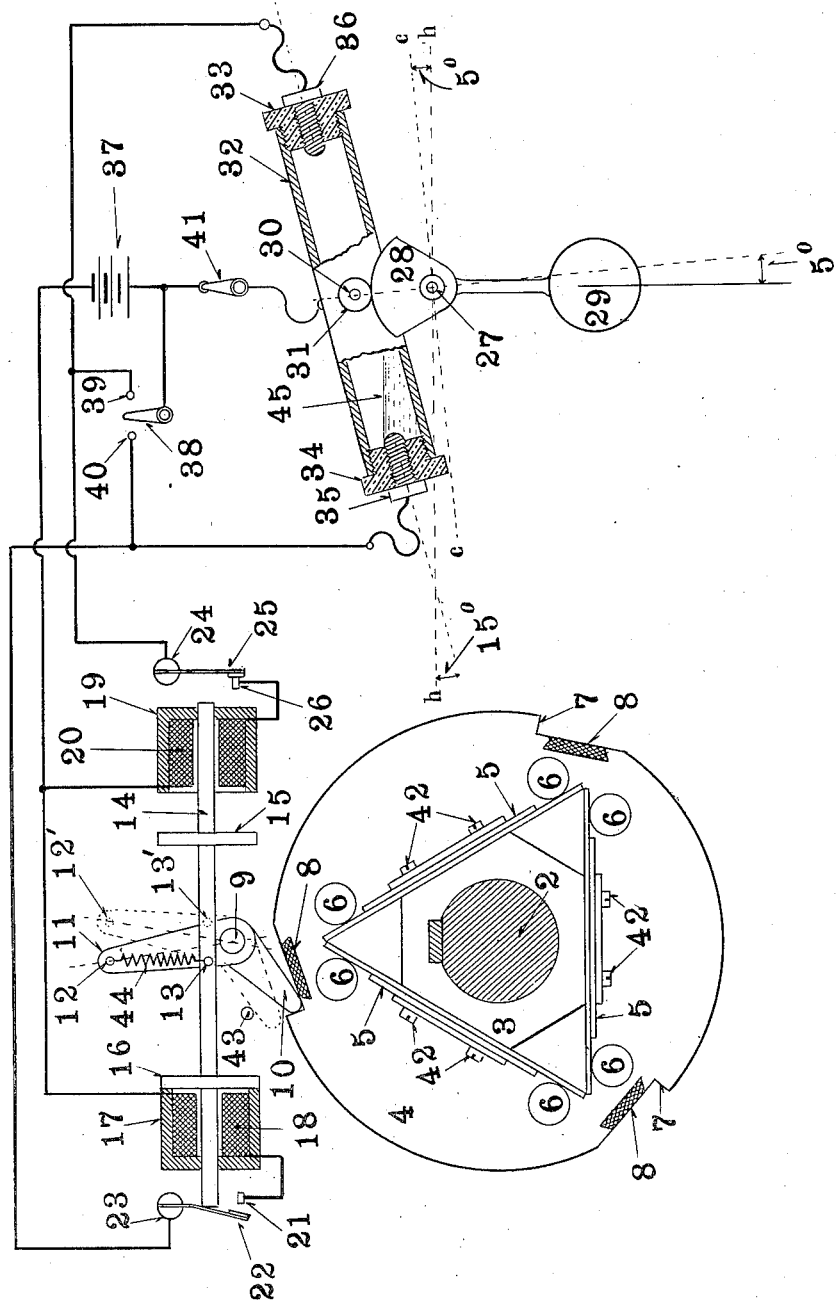
INVENTOR
Valère A. Fynn
BY
E. E. Huffman
ATTORNEY

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SAFETY DEVICE FOR AUTOMOBILES.

1,321,618.  Specification of Letters Patent.  Patented Nov. 11, 1919.

Application filed June 22, 1917. Serial No. 176,278.

*To all whom it may concern:*

Be it known that I, VALÈRE ALFRED FYNN, a subject of the King of England, residing at the city of St. Louis, State of Missouri, United States of America, have invented certain new and useful Safety Devices for Automobiles, of which the following is such a full, clear, and exact description as will enable any one skilled in the art to which it appertains to make and use the same, reference being had to the accompanying drawings, forming part of this specification.

My invention has reference to means for preventing an automobile from moving backward against the will of the operator. To this end I make use of a one-way clutch, which is normally inoperative, but can be rendered effective by the driver whenever desired or is automatically rendered effective whenever the grade up which the car travels exceeds a certain percentage or angle. If a clutch used for such a purpose is normally in service, then the wear on the coöperating parts is quite considerable, and the best forms of clutch make an objectionable noise when the revolving member they control travels in the direction in which the clutch is not effective. All these disadvantages are eliminated by so disposing the clutch elements that they are normally inoperative and out of engagement with each other.

In applying my invention to a motor car, I prefer to mount the anti-backing device inside the box containing the speed changing gears, mounting same on the propeller shaft. When so located, the anti-backing device does not require any special lubricating arrangements, and since the speed changing gear box is practically always located immediately under the driver's compartment, it becomes easy and most convenient to provide for a suitable mechanical control of the one-way clutch, should this be preferred to an electromagnetic one. In order to avoid any detrimental shock when the car is arrested by my improved anti-backing device, I prefer to introduce a yielding connection between the propeller shaft and one of the elements of the arresting device.

My invention will be better understood by reference to the accompanying drawing, diagrammatically illustrating one embodiment thereof. Keyed to the shaft 2, preferably within the speed changing gear box, is the hexagonally shaped hub 3, to three sides of which are attached laminated springs 5, by means of screws 42. A ratchet wheel 4 is loosely mounted on the shaft 2 and carries six pins 6 integral therewith and coöperating with the ends of the laminated springs 5. This ratchet wheel is provided with a number of teeth 7, three of which are shown in the figure. These teeth coöperate with a two-arm pawl, pivoted on the pin 9 integral with the gear case. This pawl has one arm 10, which is adapted to engage with the teeth of the ratchet wheel, and an arm 11 carrying a pin 12 to which is attached the controlling spring 44. The other end of this spring is attached to the pin 13 integral with the rod 14. This rod is preferably made of steel, carries the two disks 15, 16, and is adapted to slide through the housings 17 and 19 of two electromagnets located at either end of the rod 14. These electromagnets are provided with the exciting coils 18, 20, and the disks 15, 16 carried by the rod 14 act as armatures for these electromagnets. A spring-controlled and normally closed switch is located back of each electromagnet and so disposed with relation to the movable rod 14 that in one of its limiting positions said rod opens one of these switches and opens the other in its other limiting position. When the rod 14 is in the limiting position shown in the figure, then switch 22, 21, the movable member of which is supported at 23, is open, and the switch 25, 26, the movable member of which is supported at 24, is closed. In this position of the movable rod 14, the pin 13, to which one end of the spring 44 is attached, is in such a position as to hold the pawl arm 10 in engagement with a ratchet wheel 4. When the movable rod 14 occupies its other extreme position, then the pin 13 is in the position 13', and the pin 12 is forced into the position 12', and the pawl arm 10 is out of engagement with the ratchet wheel 4 and rests against the stop 43, as indicated in dotted lines. Located in some convenient part of the car is a metal tube 32, provided near its center with pins 30, which are supported by suitable bearings attached to the car and which also carry a pinion 31, gearing with the gear segment 28, which is pivoted on the shaft 27 and to which is attached the heavy weight 29. This weight will always tend to assume a vertical position independently of the grade, and its motion, because of the gear wheels 28, 31, will be transmitted to the tube 32, tilting it more or less in the one or the other direction. In the drawing the line h h represents the horizontal, and the line c c the tilt of the car, which is supposed to be moving up an incline forming an angle of five degrees with the horizontal. Under these conditions and for the proportions chosen the tube 32 will form an angle of fifteen degrees with the horizontal, as shown in the figure. Each end of this tube carries a plug 33, 34, of insulating material through each of which passes a metal terminal 35, 36. The body of the tube 32 is connected by way of the switch 41 to one terminal of a storage battery 37. The other pole of this battery is connected to one end of the exciting winding 20 and to one end of the exciting winding 18 of the electromagnets. The other end of the exciting winding 20 is connected to the terminal 36 of the movable tube by way of the switch 25, 26. The other end of the winding 18 is connected to the tube terminal 35 by way of the switch 21, 22. The tube carries a certain amount of mercury 45, the quantity of which is so chosen that when the grade up which the car travels exceeds a certain angle, connection is made between the tube body 32 and the terminal 35. When the car travels on the level, that end of the tube which carries the terminal 36 is lower than the opposing end and the mercury makes contact between the body of the tube and the terminal 36 thereof. The mercury switch can be rendered inoperative by opening switch 41. The hand-operated switch 38 makes it possible for the operator to energize the electromagnets independently of the mercury switch, when switch 41 is open.

The mode of operation of this improved device is somewhat as follows:

Assuming switch 41 to be open, thus disconnecting the automatic mercury switch, and all the parts being in the position shown, the car can move forward freely, the ratchet wheel revolving in a counterclock direction. But, since the pawl 10 is in engagement with this ratchet wheel, it will not be possible for the car to move back until the operator moves switch 38 to point 39. This action will energize the electromagnet 19 and cause the rod 14 to move from left to right, bringing the pin 13, to which the spring 44 is attached, past the center of the arm 11 of the pawl, thus snapping the pawl arm 10 out of engagement with the ratchet wheel 4. As the rod 14 nears the end of its stroke, it comes into contact with the movable member of the switch pivoted at 24 and forces the contact away from the contact 26, thus interrupting the excitation of the electromagnet 19 independently of the switch 38. Notwithstanding this interruption, the rod 14 will not change its position, because the spring 44 will hold it in place. After the switch 38 has been moved to point 39, the car may be moved backward or forward. This would be the normal condition for operation in level country. When beginning to climb a hill, the driver can place switch 38 on point 40, thus energizing the electromagnet 17, 18, and causing the rod 14, together with the pin 13, to travel from right to left. This motion will bring the pin 13 to the left of the center line of the pawl arm 11, and will cause the pawl arm 10 to snap into coöperation with the ratchet wheel 4. As the rod 14 nears the end of its travel from right to left, it strikes the element of the switch included in the circuit of the coil 18 which is pivoted at 23, and interrupts the circuit of that coil at the contacts 21, 22, the spring 44 continuing to hold the rod 14 in this extreme position. Should the driver now kill his engine when going up the hill, then the propeller shaft may, under the worst conditions, make one-third of a revolution before it is arrested by the pawl 10. This stoppage will be devoid of shock, because the laminated springs 5, coöperating with the pins 6, are interposed between the shaft 2 and the ratchet wheel 4. While the rearward motion of the car is thus arrested, yet no part of the mechanism is in any way locked, as far as the forward motion is concerned, and the car may be started under the best possible conditions and without having to overcome the friction of any brake or other locking device. The greater the number of teeth in the ratchet wheel the shorter will be the distance which the car can travel in a backward direction before its motion is arrested by this device. The gear ratio between the propeller shaft and the driving wheels is usually somewhat near 4 to 1. If three notches or teeth are provided on the ratchet wheel, then the driving wheels, for a 4 to 1 ratio, will be able to make, at most, 1/12 of a revolution. In case six notches are used, the maximum travel of the driving wheels will be 1/24 of a revolution, and so on. While this anti-backing device is operative a disagreeable noise would be produced every time the pawl arm 10 passes over a tooth of the ratchet wheel 4. In order to avoid or reduce this noise, rubber pads 8 are inserted in the body of the ratchet wheel, at and near the points which the pawl strikes when it slips off each successive tooth. Instead of these rubber pads some other resilient member may be used, such as a flat spring bent to a suitable curve.

When the driver desires to be quite sure that the anti-backing device will be made operative as soon as the car reaches a certain grade, then switch 38 is open and switch 41 closed. The conditions shown in the figure are those obtaining when the car goes up a grade forming an angle of five degrees or more with the horizontal. After this grade is surmounted, and the body of the car assumes a horizontal position, the weight 29 tilts the automatic mercury switch in the opposite direction, causing the axis of the tube to form a clockwise angle of ten degrees with the horizontal. In this position the mercury 45 connects the metallic body 32 of the tube with the terminal 36, energizes the electromagnet 19, 20, and renders the anti-backing device inoperative. As soon as the rod 14 has reached the end of its travel from left to right, it interrupts the circuit of the exciting coil 20, as before. When the car travels down hill, the clockwise angle between the axis of the automatic switch and the horizontal increases, but the connections are not changed. It is only when the car reaches an upgrade that the mercury switch is so tilted in a counter-clockwise direction as to temporarily energize the electromagnet 17, 18, and to render the anti-backing device operative.

It will be seen that the switches 25, 26, and 21, 22, operated by the rod 14, reduce the drain on the storage battery or other source very considerably, for they interrupt the current as soon as the anti-backing device has been rendered operative or inoperative.

Instead of moving the rod 14 by electromagnetic means, it is, of course, possible and sometimes desirable to move same manually. All that is necessary is to provide means which will move the rod to the left or to the right to the necessary extent.

Having fully described my invention, what I claim as new and desire to secure by Letters Patent of the United States is:

1. In an apparatus of the class described, a clutch device comprising a member attached to a rotating part of the vehicle and a locking member to coöperate therewith, said members being normally out of operative relation, electromagnetic means for bringing them into operative relation, and a pendulum controlling said electromagnetic means.

2. In an apparatus of the class described, a one-way clutch device comprising a member attached to a rotating part of the vehicle, a locking member to coöperate therewith, an electromagnet for actuating the locking member to bring it into operative position, and a second electromagnet for withdrawing the locking member from operative position.

3. In an apparatus of the class described, a clutch device comprising a member attached to a rotating part of the vehicle, a locking member to coöperate therewith, electromagnets for actuating said locking member, and means whereby the actuation of said member by an electromagnet will open the operating circuit of said magnet.

In testimony whereof, I have hereunto set my hand and affixed my seal.

VALÈRE ALFRED FYNN. [L. S.]